United States Patent [19]

Cheng

[11] Patent Number: 4,524,725

[45] Date of Patent: Jun. 25, 1985

[54] SELF-CLEANING HEAT EXCHANGER

[76] Inventor: Paul J. Cheng, c/o Phillips Petroleum Company, Bartlesville, Okla. 74004

[21] Appl. No.: 509,541

[22] Filed: Jun. 30, 1983

[51] Int. Cl.³ .............................................. F22D 1/00
[52] U.S. Cl. .................................. 122/7 R; 110/212; 165/DIG. 8; 122/367 R
[58] Field of Search ............... 110/238, 212; 122/7 R, 122/7 A, 7 C, 1 A, 1 C, 367 R, 367 C, 16, 160, 13 R; 165/DIG. 8, DIG. 10

[56] References Cited

U.S. PATENT DOCUMENTS

| | | | |
|---|---|---|---|
| 2,733,693 | 2/1956 | Johnson | 122/382 |
| 3,703,919 | 11/1972 | Owens et al. | 122/7 C |
| 3,785,350 | 1/1974 | McCormick | 122/367 R |
| 3,946,679 | 3/1976 | Varani | 110/346 |
| 4,267,801 | 5/1981 | Robinson | 122/4 D |
| 4,273,073 | 6/1981 | Robinson | 122/4 D |
| 4,316,774 | 2/1982 | Trusch | 62/324.2 |
| 4,354,440 | 10/1982 | McRee, Jr. | 110/212 |
| 4,402,915 | 9/1983 | Nishizaki et al. | 165/DIG. 17 |
| 4,405,440 | 9/1983 | Gwyn | 165/147 |
| 4,416,418 | 11/1983 | Goodstine et al. | 122/4 D |

Primary Examiner—Henry C. Yuen

[57] ABSTRACT

A novel heat exchanger for recuperating heat from a combustion gas stream is disclosed. The heat is recuperated in a steam generator formed from a shell and tube heat exchanger. To reduce deposits on the combustion gas side of the heat exchanger the tube walls are porous so that the pressure across the tube walls during steam generation will continuously drive a small amount of water or steam from the liquid side to the smoke side to remove deposits on the tubes.

8 Claims, 3 Drawing Figures

SELF-CLEANING HEAT EXCHANGER

BACKGROUND OF THE INVENTION

In one aspect, the invention relates to a heat exchanger. In another aspect, the invention relates to recuperating heat from a combustion gas stream. In yet another aspect, the invention relates to maintenance of a good heat exchange relationship. In yet another aspect, the invention relates to improved operation of a heat exchanger.

Heat exchangers are commonly deployed for steam generation services. One type of such service utilizes indirect heat exchange between water and combustion gases to convert the water into steam. Shell and tube heat exchangers are very popular for this application.

A common problem encountered in generating steam from combustion gases is that deposits reduce the efficiency of heat exchange. The deposits can occur on the steam side of the heat exchanger or on the combustion gas side. The deposits on the water side of the heat exchanger can be extremely severe where the water to be converted to steam has a high solids content, but excessive deposits can frequently be controlled by periodically blowing down the heat exchanger. Deposits on the combustion gas side of the heat exchanger can be more difficult to control. One type of combustion gas stream which leaves profuse deposits is the off-gas stream from a carbon black reactor. The particulate load in such a stream can be measured in terms of pounds per thousand standard cubic feet of gases. The particles with which the gases are laden are very fine. The thermophoretic force between the hot particulates and the relatively cool boiler tube wall drives the particulates to deposit on the wall. The result is a significant decrease in heat transfer coefficient and a low boiler efficiency. A heat exchange apparatus and process which resists fouling would be very desirable, especially for this application.

OBJECTS OF THE INVENTION

It is an object of this invention to provide a heat exchanger which resists fouling.

It is another object of this invention to provide a heat exchanger which continuously removes scaling.

It is a further object of this invention to provide a heat exchange process especially useful for steam generation characterized by a substantial curtailment of fine particulate deposits on the tube wall.

It is a still further object of this invention to provide a heat exchange apparatus and process well suited for steam generation utilizing the reactor off-gases from a carbon black reactor.

SUMMARY OF THE INVENTION

According to a first embodiment of the invention, there is provided a heat exchanger in which the wall separating the sides of the heat exchanger is formed from a porous material for controlled leakage of fluid across the wall. The heat exchanger is especially useful for steam generation in a shell and tube heat exchanger in which a tube bundle divides the inside of the heat exchanger into a low pressure combustion gas side and a high pressure water side. During steam generation, the pressure across the tube walls continuously drives a small amount of water or steam from the liquid side to the smoke side. The liquid or gas flowing across the tube wall will remove deposits on the opposite face of the tube wall to join the combustion gas stream.

According to another embodiment of the invention, there is provided an apparatus comprising a carbon black reactor, a steam generator and a conduit means connecting the carbon black reactor to the steam generator, characterized in that the steam generator comprises a shell and tube heat exchanger containing a plurality of tubes formed into a tube bundle with each tube having a sidewall formed from a porous material.

In a still further embodiment of the present invention, there is provided a process comprising flowing a gas stream containing a particulate material through the tube side of a shell and tube heat exchanger, introducing a fluid medium into the shell side of the shell and tube heat exchanger, said fluid medium being at a higher pressure than said gaseous stream, heating a first portion of the fluid medium by indirect heat exchange with a gaseous stream, withdrawing the heated first portion of the fluid medium from the shell side of the heat exchanger, flowing a second portion of the fluid medium through pores in the tube walls and into the tube side of the shell and tube heat exchanger, the second portion of the fluid medium flowing through the tube walls along at least most of the length of at least most of the tubes in the tube bundle. By using such a process to generate steam from the waste heat contained in the effluent from a carbon black reactor, it is estimated that with steam consumption of 2 percent or less into the smoke, the heat transfer coefficient of the tube bundle can be at least doubled.

DETAILED DESCRIPTION OF THE INVENTION

Figure 2:
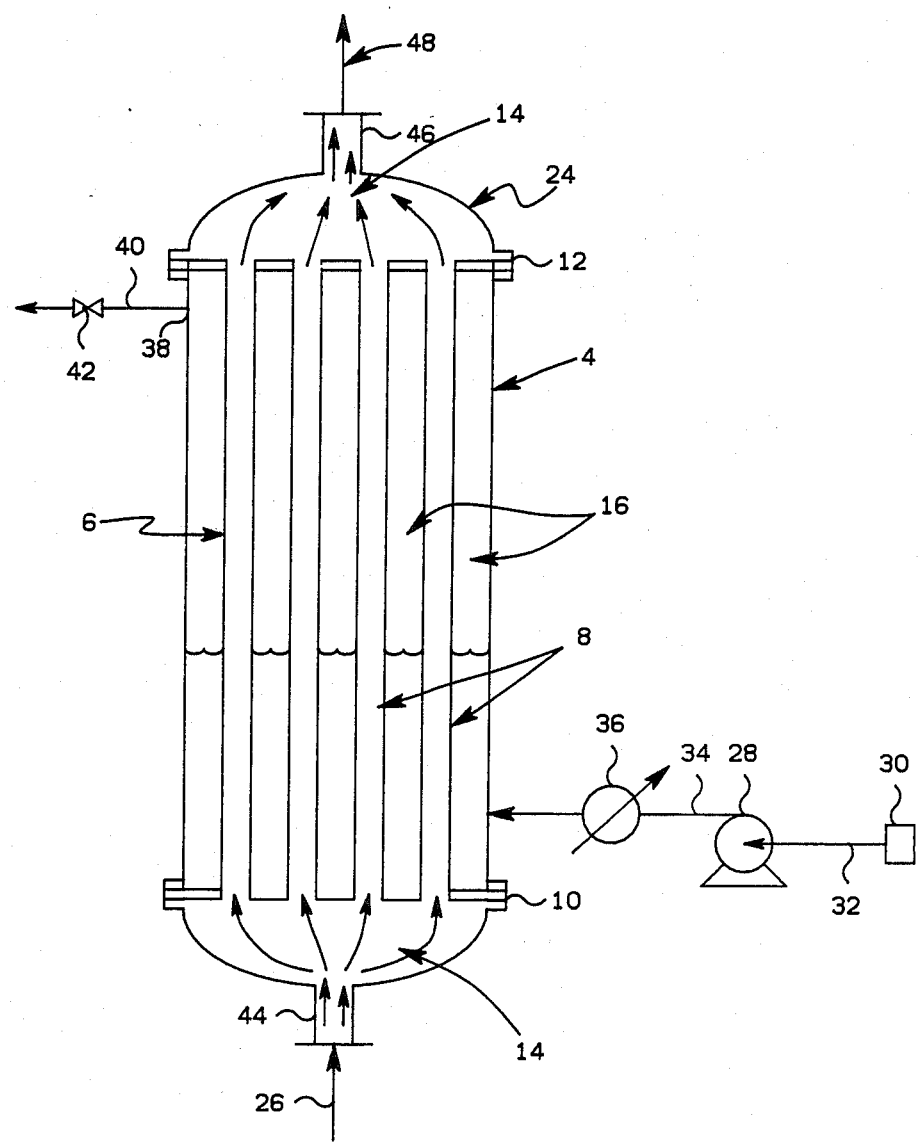
FIG. 2 is a detailed view of the shell and tube heat exchanger of the system shown in FIG. 1.

With reference to FIG. 2, a heat exchanger 24 is characterized by at least one porous wall which divides it into two sides, usually chambers. Preferably, the heat exchanger 24 comprises an outer shell 4 surrounding a bundle of tubes 6. The tube walls divide the heat exchanger into a shell side and a tube side. In accordance with one embodiment of the invention, the walls of the tubes of the bundle 6 are formed from a porous material for controlled leakage of fluid across the tube walls.

Usually, the bundle 6 will comprise a plurality of parallel tubes 8 connected to at least a first tube sheet 10. In FIG. 2, the tubes are also connected to a second tube sheet 12 although many heat exchangers utilize a tube bundle formed from U-shaped tubes with the tubes attached at both ends to a single tube sheet, and the invention would be applicable to these types of tube bundles as well. The tubes 8 and the tube sheets 10 and 12 divide the heat exchanger 24 into a tube side 14 and a shell side 16. Controlled leakage between the sides 14 and 16 is provided by the porous tube walls of the tubes 8.

Figure 3:
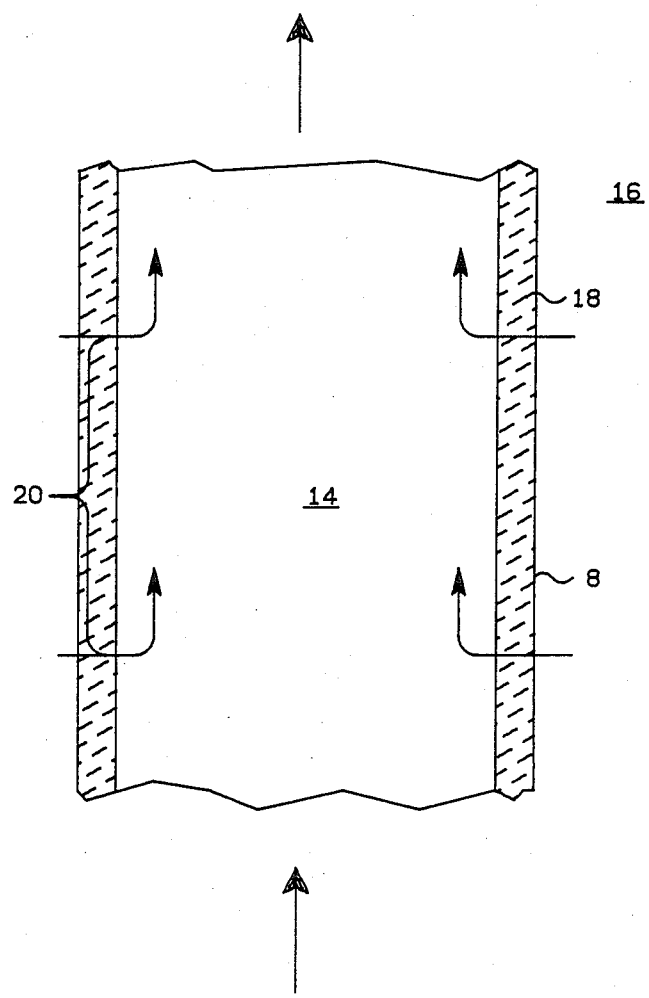
FIG. 3 is a detailed fragmental view of a section of a tube of the heat exchanger shown in FIG. 2.

With reference to FIG. 3, this controlled leakage across a wall 18 of each tube 8 is represented by arrows 20. For steam generation, it is preferred that the combustion gases flow through the tube side 14 of the heat exchanger while principally water and steam exist on the shell side 16. Of course, it desired, the relationship could be reversed. Flow 20 of a portion of the fluid from the shell side 16 mitigates deposits on the tube side 14 of the heat exchanger.

The wall 18 of the tubes 8 should have sufficient thickness to withstand the pressure drop from the high pressure to the low pressure sides of the heat exchanger. For example, the pressure on the combustion gas side of the heat exchanger will generally only be a few pounds per square inch gauge while the pressure on the steam side will of course depend on the temperature of the steam desired. Steam having a temperature of about 500° F. will be at a pressure of about 600 pounds per square inch, for example. Besides structural strength, it is important that the steam generator tubes be formed from a material which is resistant to high temperatures. The tail gases from a carbon black reactor, for example, will sometimes have a temperature in excess of 2000° F. Some types of materials possessing sufficient porosity would clearly not withstand the temperatures involved. The material of construction must be corrosion resistant since the formation of oxides in the form of corrosion would tend to plug the pores in the tube walls. The required porosity of the material of construction will depend upon the pressure drop between the smoke side and the liquid side of the tube bundle.

The porous wall material having the most desired properties are generally sintered metal or ceramics. Sintered alumina, zirconium, stainless steel, nickel, or monel are good examples to name a few. Also sintered ceramics or fire brick material would be usable. A sintered carbon steel also could be used except that corrosion possibilities would need to be examined. A most preferred material is sintered 316 stainless steel having a 0.5 micron rating, 0.45 porosity available from AMF Cuno, 400 Research Parkway, Meriden, Conn. 06450.

Generally, the shell and tube heat exchanger will be fabricated from noncorrosive high temperature, high pressure metals. The shell can be made from carbon steel. The tubes can be from sintered stainless steel, for example, over the majority of their length and be provided with solid stainless steel tube ends. The sintered section can extend into the solid end section and be welded, soldered or pressed to provide structural integrity. The solid end section will allow attachment of the tubes to the tube sheets by conventional means such as explosive expansion followed by welding. The tube bundle does not require internal tube support means if it is of a short length. For longer length tube bundles a well organized rod support grid can be used to eliminate vibration. Caution on the amount of pressure used between tubes and rods is necessary due to the relative brittleness of the tubes.

Figure 1:
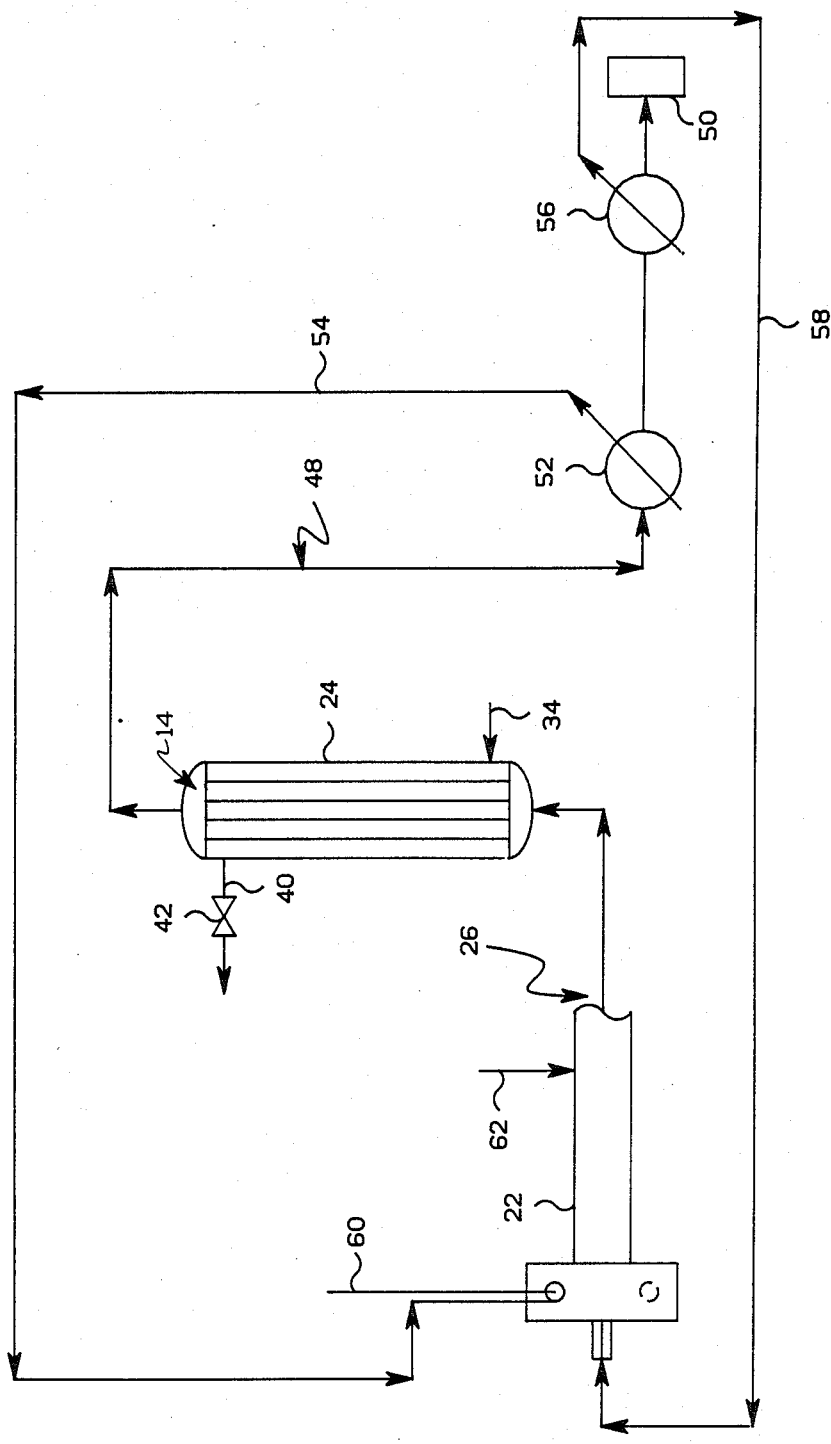
FIG. 1 schematically illustrates the invention as embodied in a carbon black waste heat recovery system.

It is expected that a heat exchanger as shown in FIG. 2 will have good utility when deployed in a process stream from a carbon black reactor as shown in FIG. 1. According to this embodiment of the invention, an apparatus comprises a carbon black reactor 22, a steam generator 24, and a conduit means 26 connecting the carbon black reactor 22 to the steam generator 24. The steam generator 24 can comprise a shell and tube heat exchanger as previously described containing a plurality of tubes formed into a tube bundle with each tube having a sidewall formed from a porous material. Preferably, the conduit means 26 connecting the carbon black reactor 22 to the shell and tube exchanger 24 is connected to the tube side 14 of the shell and tube heat exchanger 24. With reference to FIG. 2, a pump 28 is connected to a water supply 30 by a second conduit means 32. A third conduit means 34 connects the pump to the shell side 16 of the heat exchanger. The conduit means 34 preferably further comprises a heater 36 for preheating the water contained in the line 34 to a suitable temperature and pressure prior to introducing it into the shell side 16 of the heat exchanger. The shell 4 is provided with an outlet 38 for exhausting steam. The outlet 38 is connected to a conduit 40 having a valve 42 positioned therein to control the pressure and temperature of the steam being generated. Carbon black containing smoke flows from an inlet 44 of the tube side of the heat exchanger to an outlet 46. As the smoke flows through the tubes, it picks up additional water vapor leaking through from the shell side. The insides of the tubes are self-cleaning due to the flashing of the water as it crosses the tube wall.

A conduit means 48 leads from the outlet 46 of the steam generator to carbon black collection zone 50. A heat exchanger 52 provides for indirect heat exchange between the reactor off-gases in conduit 48 and air conveyed by the line 54 which connects the heat exchanger 52 with the reactor 22. A heat exchanger 56 also provides for indirect heat exchange between the reactor off-gases carried by line 48 and oil feed carried by the lines 58 which connects the heat exchanger 56 with the reactor 22. In the reactor 22, combustible gas introduced via lines 60 is combusted with air introduced into the reactor 22 via the line 54 to form combustion gases. Oil feedstock is injected into the combustion gases via the line 58. The combustion gases pyrolyze a portion of the oil feed to form carbon black. The reaction is terminated by introducing a quench fluid into the reactor through a line 62 to cool the reactor effluent to a temperature of about 2000° or below. Usually the quench fluid is water.

In another aspect of the present invention, there is provided a process comprising flowing a gaseous stream containing a particulate material such as would be indicated by the numeral 26 through the tube side of a shell and tube heat exchanger such as would be indicated by the numeral 24. A fluid medium is introduced into the shell side of the shell and tube heat exchanger which is at a high pressure than the gaseous stream, for example, through the line 34. A first portion of the thus introduced fluid medium is heated by indirect heat exchange with the gaseous stream. This first portion of the heated fluid medium is withdrawn from the shell side of the heat exchanger, for example, via the line 40. Preferably, 80% or more, more preferably 90% or more, most preferably in the range of 95% to 99.5% of the fluid introduced into the shell side forms the first portion. A second portion of the fluid medium is flowed through pores in the tube walls and into the tube side of the shell and tube heat exchanger, for example, as indicated by the numerals 20. Preferably, the second portion of the fluid medium flows through the tube walls along at least most of the length of at least most of the tubes in the tube bundle. Usually, the second portion will be less than 20% of the fluid introduced into the shell side, generally less than 10%, such as between about 0.5% and 5%, based on mass flow.

The fluid medium most preferably comprises water which is converted to steam by indirect heat exchange with the gaseous stream. The particulate material which is carried by the gaseous stream most preferably comprises carbon black since the invention is expected to be highly useful for carbon black production. The second portion of the fluid medium flowing through the pores in the tube walls mitigates the deposition of carbon black in the tube side of the shell and tube heat exchanger and is withdrawn from the heat exchanger along with the gaseous stream containing the carbon black. In order to ensure adequate flow through the tube walls and vigorous flashing of the fluid medium as it flows through the tube walls, a pressure drop of at least 300 pounds per square inch gauge across the tube walls is very desirable. The preferred flow rate across the porous medium of the tube wall can be expressed in a volume per area per time unit. In the preferred embodiment of the invention a flow of 0.05 cubic feet per square foot per minute at a pressure drop of 300 psi across the tube wall will provide an approximate two (2) percent steam loss to the gas side of the tubes. The water used is preferably distillate to prevent reducing the porosity of the tube walls by solids deposition from the water.

The invention is illustrated by the followiing calculated example.

CALCULATED EXAMPLE (I) Tube Side:
Number of Tubes: 195
   External Diameter, Inches: 2.25
   Internal Diameter, Inches: 1.5
   Length, Feet: 8
(II) Shell Side:
   Diameter, Feet: 6.5
   Length (Tube Sheet To Tube Sheet), Feet: 8

|  | Standard (Unsintered) Tubes | Invention (Sintered) Tubes |
| --- | --- | --- |
| Water Charged to Shell: | | |
| Volume, Gal/Hr, | 797 | 1155 |
| Pressure, psia, | 610 | 610 |
| Temperature, °F., | 486 | 486 |
| Steam Produced (Saturated): | | |
| Pounds/Hr, | 6,650 | 9,440[a] |
| Pressure, psia, | 600 | 600 |
| Temperature, °F. | 486 | 486 |
| Smoke In (Tubes' Side): | | |
| SCF/Hr, | 342,000 | 342,000 |
| Lbs, Carbon Black/1000 SCF, | 5.25 | 5.25 |
| Temperature, °F., | 2,000 | 2,000 |
| Pressure, psia, | 20 | 20 |
| Smoke Out: | | |
| SCF/Hr, | 342,000 | 346,000[b] |
| Lbs, Carbon Black/1000 SCF | 5.25 | 5.19 |
| Temperature, °F., | 1,450 | 1,200[c] |
| Pressure, psia, | 19 | 19 |

[a]About 2% of steam in invention exits in smoke via tubes.
[b]2% of steam produced exits in cooled smoke.
[c]This lower temperature represents about 46% additional cooling of smoke due to invention.

That which is claimed:
1. Apparatus comprising
  (a) a carbon black reactor
  (b) a steam generator; and
  (c) conduit means connecting the carbon black reactor to the steam generator;
wherein the steam generator comprises a shell and tube heat exchanger containing a plurality of tubes formed into a tube bundle with each tube having a sidewall formed from a porous material.

2. An apparatus as in claim 1 wherein the tube bundle further has a first end and a second end and a first tube sheet at the first end and a second tube sheet at the second end and the plurality of tubes are positioned parallel to one another and attached to the first tube sheet at the first end of the tube bundle and the second tube sheet at the second end at the tube bundle, the shell being associated with the first tube sheet and the second tube sheet so as to partition the inside of the tubes from the outside and divide the shell and tube heat exchanger into a shell side and a tube side.

3. An apparatus as in claim 2 further comprising a pump, a second conduit connecting the pump to a water supply and a third conduit connecting the pump to the shell side of the shell and tube heat exchanger, wherein the conduit means connecting the carbon black reactor to the steam generator is connected to the tube side of the shell and tube heat exchanger.

4. An apparatus as in claim 3 wherein at least a portion of the tubes in the tube bundle are formed from sintered stainless steel.

5. A process comprising
flowing a gaseous stream containing a particulate material from a carbon black reactor through the tube side of a shell and tube heat exchanger;
introducing a fluid medium into the shell side of the shell and tube heat exchanger, said fluid medium being at higher pressure than said gaseous stream;
heating a first portion of the fluid medium by indirect heat exchange with the gaseous stream;
withdrawing the first portion of the heated fluid medium from the shell side of the heat exchanger;
flowing a second portion of the fluid medium through pores in the tube walls and into the tube side of the shell and tube heat exchanger, said second portion of the fluid medium flowing through the tube walls along at least most of the length of at least most of the tubes in the tube bundle.

6. A process as in claim 5 wherein the fluid medium comprises water and the first portion of the fluid medium is converted to steam by indirect heat exchange with the gaseous stream.

7. A process as in claim 6 wherein the particulate material comprises carbon black and the second portion of the fluid medium flowing through the pores in the tube walls mitigates the deposition of carbon black in the tube side of the shell and tube heat exchanger, the second portion of the fluid medium being withdrawn from the heat exchanger along with the gaseous stream containing carbon black.

8. A process as in claim 7 wherein the second portion of the fluid medium undergoes a pressure drop of at least 300 psig as it passes through the tube walls.

* * * * *

UNITED STATES PATENT AND TRADEMARK OFFICE
CERTIFICATE OF CORRECTION

PATENT NO. : 4,524,725

DATED : June 25, 1985

INVENTOR(S) : Paul J. Cheng

It is certified that error appears in the above-identified patent and that said Letters Patent are hereby corrected as shown below:

Title page should show Phillips Petroleum Company as Assignee.

Claim 2, Col. 6, line 13, delete "at", second occurrence, and substitute ---of--- therefor.

Signed and Sealed this

Twenty-second Day of April 1986

[SEAL]

Attest:

DONALD J. QUIGG

Attesting Officer

Commissioner of Patents and Trademarks